US012244223B2

(12) United States Patent
Maejima et al.

(10) Patent No.: US 12,244,223 B2
(45) Date of Patent: Mar. 4, 2025

(54) CONTROL CIRCUIT OF POWER FACTOR IMPROVEMENT CIRCUIT AND SEMICONDUCTOR INTEGRATED CIRCUIT DEVICE

(71) Applicant: ROHM CO., LTD., Kyoto (JP)

(72) Inventors: Satoshi Maejima, Kyoto (JP); Takumi Fujimaki, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 18/312,807

(22) Filed: May 5, 2023

(65) Prior Publication Data
US 2023/0275507 A1    Aug. 31, 2023

Related U.S. Application Data

(62) Division of application No. 17/491,883, filed on Oct. 1, 2021, now Pat. No. 11,705,807.

(30) Foreign Application Priority Data

Oct. 5, 2020 (JP) .................................. 2020-168299
Oct. 6, 2020 (JP) .................................. 2020-169303

(51) Int. Cl.
*H02M 1/42* (2007.01)
*H02M 1/08* (2006.01)
(Continued)

(52) U.S. Cl.
CPC ............ *H02M 1/4208* (2013.01); *H02M 1/08* (2013.01); *H02M 1/32* (2013.01); *H05B 45/345* (2020.01);
(Continued)

(58) Field of Classification Search
CPC ........ H02M 1/4208; H02M 1/08; H02M 1/32; H02M 1/0009; H02M 1/007;
(Continued)

(56) References Cited

U.S. PATENT DOCUMENTS 9,049,764 B2 * 6/2015 Yang ...................... H05B 45/37
2005/0078492 A1 * 4/2005 Takahashi ......... H02M 3/33523
363/21.15
(Continued)

FOREIGN PATENT DOCUMENTS

| JP | H11-103571 | 4/1999 |
| JP | 2007-295800 | 11/2007 |
| JP | 2012182968 | 9/2012 |

OTHER PUBLICATIONS

JP OA—Japanese Patent Office, Office Action in Japanese Appln. No. 2020-168299 with search report, dated May 28, 2024, 33 pages (with machine translation).

*Primary Examiner* — Daniel D Chang
(74) *Attorney, Agent, or Firm* — Fish & Richardson P.C.

(57) ABSTRACT

The present disclosure provides a power factor improvement circuit with a DC/DC converter including an arithmetic circuit. A first voltage having a full-wave rectified waveform is received by an input voltage detection terminal of the power factor improvement circuit. A second voltage is generated by amplifying an error between a first detection voltage and a reference voltage according to an output voltage of the DC/DC converter. A third voltage is generated by multiplying the first voltage by the second voltage. The arithmetic circuit adds an offset voltage to a third voltage to generate a fourth voltage. A comparator is configured to compare a second detection voltage with the fourth voltage. A drive circuit is configured to turn on/off drive of the switching transistor according to an output of the comparator. When the second detection voltage is higher than the fourth voltage, the switching transistor is turned off.

7 Claims, 9 Drawing Sheets

(51) Int. Cl.
*H02M 1/32* (2007.01)
*H05B 45/345* (2020.01)
*H05B 45/355* (2020.01)
*H05B 45/3725* (2020.01)

(52) U.S. Cl.
CPC ....... *H05B 45/355* (2020.01); *H05B 45/3725* (2020.01)

(58) Field of Classification Search
CPC .............. H02M 1/4225; H02M 1/0032; H05B 45/345; H05B 45/355; H05B 45/3725; H05B 45/382; H05B 45/36; Y02B 70/10; G05F 3/26
See application file for complete search history.

(56) References Cited

U.S. PATENT DOCUMENTS

| | | |
|---|---|---|
| 2010/0097828 A1 | 4/2010 | Chen |
| 2016/0241149 A1* | 8/2016 | Chen ................. H02M 3/33523 |
| 2020/0395843 A1 | 12/2020 | Hiasa |
| 2022/0109366 A1 | 4/2022 | Maejima et al. |

* cited by examiner

CONTROL CIRCUIT OF POWER FACTOR IMPROVEMENT CIRCUIT AND SEMICONDUCTOR INTEGRATED CIRCUIT DEVICE

CROSS-REFERENCE TO RELATED APPLICATIONS

This application is a divisional application of U.S. application Ser. No. 17/491,883, filed Oct. 1, 2021, which claims the priority of Japanese Patent Application Nos. 2020-168299, filed Oct. 5, 2020 and 2020-169303 filed on Oct. 6, 2020, the disclosures of which are incorporated herein by reference in their entirety.

BACKGROUND

Technical Field

The disclosure of the present application relates to a control circuit of a power factor improvement circuit and a semiconductor integrated circuit device.

Description of the Prior Art

A power factor improvement circuit monitors an alternating-current (AC) input voltage and an AC input current of a power device that performs AC/direct-current (DC) conversion, so that phases thereof are in a state of substantially aligned to keep the power factor of approximately 1 (that is, 100%) (for example, reference patent publication 1).

FIG. 13 shows a brief configuration diagram of a power factor improvement circuit of a conventional semiconductor integrated circuit device of the prior art. The power factor improvement circuit shown in FIG. 13 includes a conventional semiconductor integrated circuit device 101, an output circuit 102, a resistor 103, a capacitor 104, inductors 105 and 106, and a diode 107.

The conventional semiconductor integrated circuit device 101 controls a switching transistor in the output circuit 102. The output circuit 102 converts a full-wave rectified voltage $V_H$ into an adjusted output voltage $V_{DC}$, which is supplied to a load 108.

The inductor 105 is disposed at a power line LN1, and the inductor 106 is magnetically coupled with the inductor 105.

The resistor 103 is disposed between a terminal VCC of the conventional semiconductor integrated circuit device 101 and the power line LN1. The capacitor 104 is disposed between the terminal VCC of the conventional semiconductor integrated circuit device 101 and a ground potential. The diode 107 is disposed between the terminal VCC of the conventional semiconductor integrated circuit device 101 and the inductor 106.

A current flowing in the resistor 103 is persistently supplied to the terminal VCC of the conventional semiconductor integrated circuit device 101, and a current flowing in the diode 107 is supplied only when the switching transistor in the output circuit 102 performs switching. A voltage supplied to the terminal VCC is used as a power supply voltage $V_{CC}$ in the conventional semiconductor integrated circuit device 101.

The conventional semiconductor integrated circuit device 101 includes a comparator 101A. The comparator 101A is a hysteresis comparator, compares the power supply voltage $V_{CC}$ with a threshold voltage, and outputs a low voltage lockout signal UVLO indicative of a comparison result. If the power supply voltage $V_{CC}$ is equal to or more than the threshold voltage, the low voltage lockout signal UVLO becomes a low level (indicating a level of a normal state), and if the power supply voltage $V_{CC}$ is less than the threshold voltage, the low voltage lockout signal UVLO becomes a high level (indicating a level of an abnormal state). The threshold voltage used by the comparator 101A converts a first threshold voltage $V_{TH1}$ and a second threshold voltage $V_{TH2}$ according to the level of the low voltage lockout signal UVLO.

The conventional semiconductor integrated circuit device 101 stops the switching operation of the switching transistor in the output circuit 102 when certain abnormal conditions such as a low voltage of the power supply voltage $V_{CC}$, an overvoltage of the output voltage $V_{DC}$ and overheating are detected. On the other hand, the conventional semiconductor integrated circuit device 101 allows the switching operation of the switching transistor in the output circuit 102 when certain abnormal conditions such as a low voltage of the power supply voltage $V_{CC}$, an overvoltage of the output voltage $V_{DC}$ and overheating are not detected.

Moreover, the conventional semiconductor integrated circuit device 101 is in a so-called standby state and consumes less electricity when the low voltage lockout signal UVLO is at a high level (indicating a level of an abnormal state).

PRIOR ART DOCUMENT

[Patent Publication]
  [Patent document 1] Japan Patent Publication No. 2012-182968

SUMMARY

Problems to be Solved by the Disclosure

The distortion of an AC input current is represented by total harmonic distortion (THD). The THD is large, there is a concern that devices other than the electronic device mounted with the power factor improvement circuit may be undesirably affected. That is to say, control for minimizing THD is desired in a power factor improvement circuit.

FIG. 14 shows a timing diagram of a waveform of the power supply voltage $V_{CC}$ of the conventional semiconductor integrated circuit device 101. At a first timing t1, some anomalies are detected, and the switching operation of the switching transistor is stopped.

If the switching operation of the switching transistor is stopped, no current flows in the diode 107. Moreover, the current consumed by the conventional semiconductor integrated circuit device 101 is greater than the current flowing in the resistor 103, and the power supply voltage $V_{CC}$ gradually decreases.

If the power supply voltage $V_{CC}$ decreases to the first threshold voltage $V_{TH1}$, the conventional semiconductor integrated circuit device 101 then becomes a standby state by means of low voltage lockout, and the current consumed by the conventional semiconductor integrated circuit device 101 then is less than the current flowing the in resistor 103, and the power supply voltage $V_{CC}$ gradually increases.

If the power supply voltage $V_{CC}$ increases to the second threshold voltage $V_{TH2}$, low voltage lockout is relieved, and the conventional semiconductor integrated circuit device 101 becomes a non-standby state. At this point, if detection for certain anomalies continues, the power supply voltage $V_{CC}$ again gradually decreases.

As long as detection for certain anomalies continues, the power supply voltage $V_{CC}$ repeatedly decreases and increases.

Herein, at a second timing t2, an anomaly other than the low voltage of the power supply voltage $V_{CC}$ is eliminated. Even if the anomaly other than the low voltage of the power supply voltage $V_{CC}$ is eliminated, the switching operation of the switching transistor is however not immediately restored since the second timing t2 is still within low voltage lockout. At a third timing t3 at which the power supply voltage $V_{CC}$ increases to the second threshold voltage $V_{TH2}$, low voltage lockout is finally relieved, the switching operation of the switching transistor is restored, and the power supply voltage $V_{CC}$ further increases.

Moreover, if the load 108 is changed to a heavy load at the second timing t2, because the change in the load cannot be responded to while the switching operation is stopped, the power supply voltage $V_{CC}$ decreases.

If the power supply voltage $V_{CC}$ does not decrease when the switching transistor in the output circuit 102 is stopped, the switching operation may be quickly restored when the anomaly is released.

To prevent the power supply voltage $V_{CC}$ from decreasing when the switching transistor in the output circuit 102 is stopped, it is considered to increase the capacitance of the capacitor 104. However, in this method, the cost of the capacitor 104 is accordingly increased. Moreover, since when the anomaly is eliminated is uncertain and the duration in which the switching operation is stopped is uncertain, even if the capacitance of the capacitor 104 is increased, the power supply voltage $V_{CC}$ is nonetheless caused to decrease if the duration in which the switching operation is stopped is long.

To prevent the power supply voltage $V_{CC}$ from decreasing when the switching transistor in the output circuit 102 is stopped, it is further considered to decrease the resistance of the resistor 103 and increase the current flowing in the resistor 103. However, in this method, the cost of the resistor 103 is accordingly increased.

As described above, the conventional semiconductor integrated circuit device 101 has issues of poor load responsiveness.

Technical Means for Solving the Problem

In the disclosure of the present application, a control circuit, which is a power factor improvement circuit with a DC/DC converter, is configured as below (first configuration), that is, including: an input voltage detection terminal, configured to receive a first voltage with a full-wave rectified waveform; an error amplifier circuit, configured to amplify an error between the first detection voltage and a reference voltage according to an output voltage of the DC/DC converter and generate a second voltage; an arithmetic circuit, configured to add an offset voltage to a third voltage to generate a fourth voltage, wherein the third voltage is generated by multiplying the first voltage by the second voltage; a comparator, configured to compare a second detection voltage with the fourth voltage, wherein the second detection voltage is corresponding to a current flowing through a switching transistor of the DC/DC converter; and a drive circuit, configured to turn on/off drive of the switching transistor according to an output of the comparator, wherein the switching transistor is turned off when the second detection voltage is higher than the fourth voltage.

Moreover, the control circuit of the first configuration may also be configured as below (second configuration), that is, the arithmetic circuit is configured to change the offset voltage according to the first voltage.

Moreover, the control circuit of the second configuration may also be configured as below (third configuration), that is, the arithmetic circuit is configured to change the offset voltage in a manner that the higher the first voltage is, the smaller the offset voltage is.

Moreover, the control circuit of the third configuration may also be configured as below (fourth configuration), that is, the arithmetic circuit is configured to change the offset voltage in a manner that the higher the first voltage is, the linearly smaller the offset voltage is.

Moreover, the control circuit of any one of the first to fourth configurations may also be configured as below (fifth configuration), that is, a minimum value of the offset voltage is equal to or greater than zero.

Moreover, the control circuit of any one of the second to fifth configurations may also be configured as below (sixth configuration), that is, the arithmetic circuit includes: a constant current circuit, configured to generate a constant current; and a first current generation circuit, configured to generate a first current corresponding to the first voltage and generate the offset voltage based on a current after the first current is drawn from the constant current.

In the disclosure of the present application, a power factor improvement circuit is configured as below (seventh configuration), that is, including: an output circuit of a DC/DC converter including a switching transistor; and the control circuit of any one of the first to sixth configurations, configured to drive the switching transistor.

In the disclosure of the present application, an electronic device is configured as below (eighth configuration), that is, including: a rectifier circuit, configured to full-wave rectify an AC voltage; and the power factor improvement circuit of the seventh configuration, configured to receive an output voltage of the rectifier circuit.

In the disclosure of the present application, a semiconductor integrated circuit device is configured as below (ninth configuration), that is, comprising: a terminal, configured to be applied with a power supply voltage; an anomaly detection circuit, configured to detect an anomaly; an output stop circuit, configured to stop an output of the semiconductor integrated circuit device when the anomaly is detected by the anomaly detection circuit; and a suppression circuit, configured to suppress current consumption of the semiconductor integrated circuit device when the anomaly is detected by the anomaly detection circuit.

Moreover, the semiconductor integrated circuit device of the first configuration may also be configured as below (tenth configuration), that is, further including: an overvoltage detection circuit, configured to detect whether the power supply voltage is an overvoltage; and a current drawing circuit, configured to draw a current from the terminal when the overvoltage of the power supply voltage is detected by the overvoltage detection circuit.

Moreover, the semiconductor integrated circuit device of the first or second configuration may also be configured as below (eleventh configuration), that is, the suppression circuit includes: an oscillation circuit, configured to oscillate a clock signal; and a logic circuit, operating according to the clock signal, wherein the oscillation circuit is disabled when the anomaly is detected by the anomaly detection circuit.

In the disclosure of the present application, a load drive circuit is configured as below (twelfth configuration), that is, including: the semiconductor integrated circuit device of any one of first to third configurations, wherein a load is driven according to the output of the semiconductor integrated circuit device.

Moreover, the load drive circuit of the fourth configuration may also be configured as below (thirteenth configuration), wherein the power supply voltage becomes greater when the output of the semiconductor integrated circuit device is stopped than when the output of the semiconductor integrated circuit device is not stopped.

Moreover, the load drive circuit of the fourth or fifth configuration may also be configured as below (fourteenth configuration), that is, the load drive circuit is a power factor improvement circuit.

In the disclosure of the present application, an electronic device is configured as below (fifteenth configuration), that is, including: a load; and a load drive circuit of any of the fourth to sixth configurations for driving the load.

Moreover, the electronic device of the seventh configuration may also be configured as below (sixteenth configuration), that is, the electronic device is a lighting device capable of performing at least one of dimming and toning.

Effects of the Disclosure

The control circuit in the disclosure of the present application is capable of suppressing the THD in a power factor improvement circuit.

The semiconductor integrated circuit device in the disclosure of the present application is capable of improving load responsiveness.

DETAILED DESCRIPTION OF THE EMBODIMENTS

In the disclosure, a reference voltage refers to a fixed voltage in an ideal state, and is in practice a voltage slightly variable in response to temperature changes.

In the disclosure, a constant current refers to a fixed current in an ideal state, and is in practice a current slightly variable in response to temperature changes.

In the disclosure, a constant voltage refers to a fixed voltage in an ideal state, and is in practice a voltage slightly variable in response to temperature changes.

Figure 1:
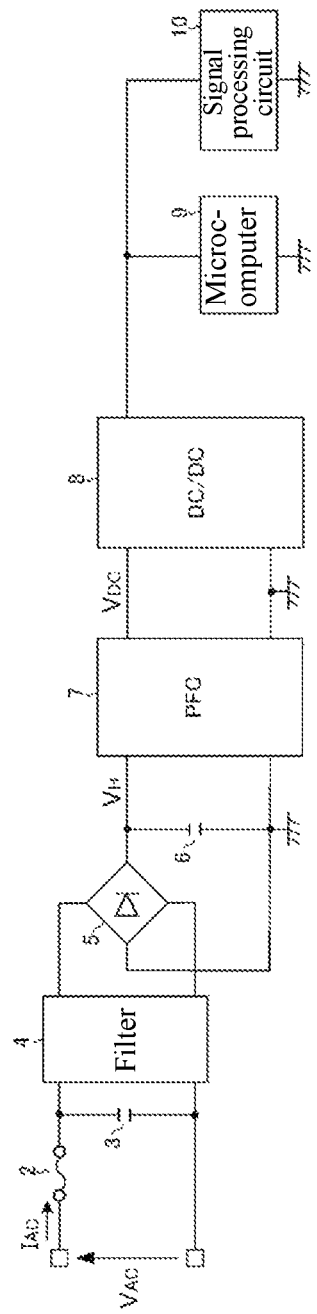
FIG. 1 is a diagram of a configuration of an electronic device according to an embodiment.

FIG. 1 shows a diagram of a configuration of an electronic device 1 according to an embodiment. For example, the electronic device 1 is a household appliance such as a television, a refrigerator or an air conditioner, or a computer. The electronic device 1 may also be a lighting device capable of performing at least one of dimming and toning. A light emitting element used by a lighting device is, for example, a light emitting diode (LED), and organic electroluminescence (EL). In the lighting device, a load changes when the setting of dimming or toning is changed. In the lighting device, if load responsiveness is improved, the time required from sending by a controller a signal as an instruction for changing the setting of dimming or toning to completing the change in the setting of dimming or toning can be reduced.

The electronic device 1 includes a fuse 2, a capacitor 3, a filter 4, a rectifier circuit 5, a capacitor 6 and a power factor correction (PFC) circuit 7. The electronic device 1 further includes a DC/DC converter 8, a microcomputer 9 and a signal processing circuit 10. The electronic device 1 is divided into a primary side and a secondary side insulated from each other by setting an insulating transformer (not shown) of the DC/DC converter 8 as a boundary.

The rectifier circuit 5 is, for example, a diode bridge rectifier circuit. An AC voltage $V_{AC}$ such as a commercial AC voltage is supplied to the rectifier circuit 5 through the fuse 2, the capacitor 3 and the filter 4. The rectifier circuit 5 full-wave rectifies the AC voltage $V_{AC}$ and generates a first voltage $V_H$. Thus, the first voltage $V_H$ has a full-wave rectified waveform.

The first voltage $V_H$ is supplied to the PFC circuit 7 through the capacitor 6. The PFC circuit 7 has a step-up DC/DC converter (switching regulator) that generates an output voltage $V_{DC}$ from the first voltage $V_H$. The PFC circuit 7 improves the power factor by aligning phases of the first voltage $V_H$ and an input current IAC.

The DC/DC converter 8 receives and steps down the output voltage $V_{DC}$ of the PFC circuit 7, and supplies the stepped down voltage to the load, that is, each of the microcomputer 9 and the signal processing circuit 10.

The microcomputer 9 universally controls the entire electronic device 1. The signal processing circuit 10 is a block that performs specific signal processing, and is, for example, an interface circuit communicating with an external device, an image processing circuit or an audio processing circuit. In the actual electronic device 1, multiple signal processing circuits are provided according to the function thereof.

Associated details of the configuration of the electronic device 1 are as described above. Thus, AC/DC conversion is performed by the electronic device, and the electronic device includes: the rectifier circuit 5, full-wave rectifying the AC voltage $V_{AC}$; and the PFC circuit 7, generating the output voltage $V_{DC}$ by stepping up the full-wave rectified first voltage $V_H$. Next, details of the PFC circuit 7 mounted on the electronic device 1 are given below.

Figure 2:
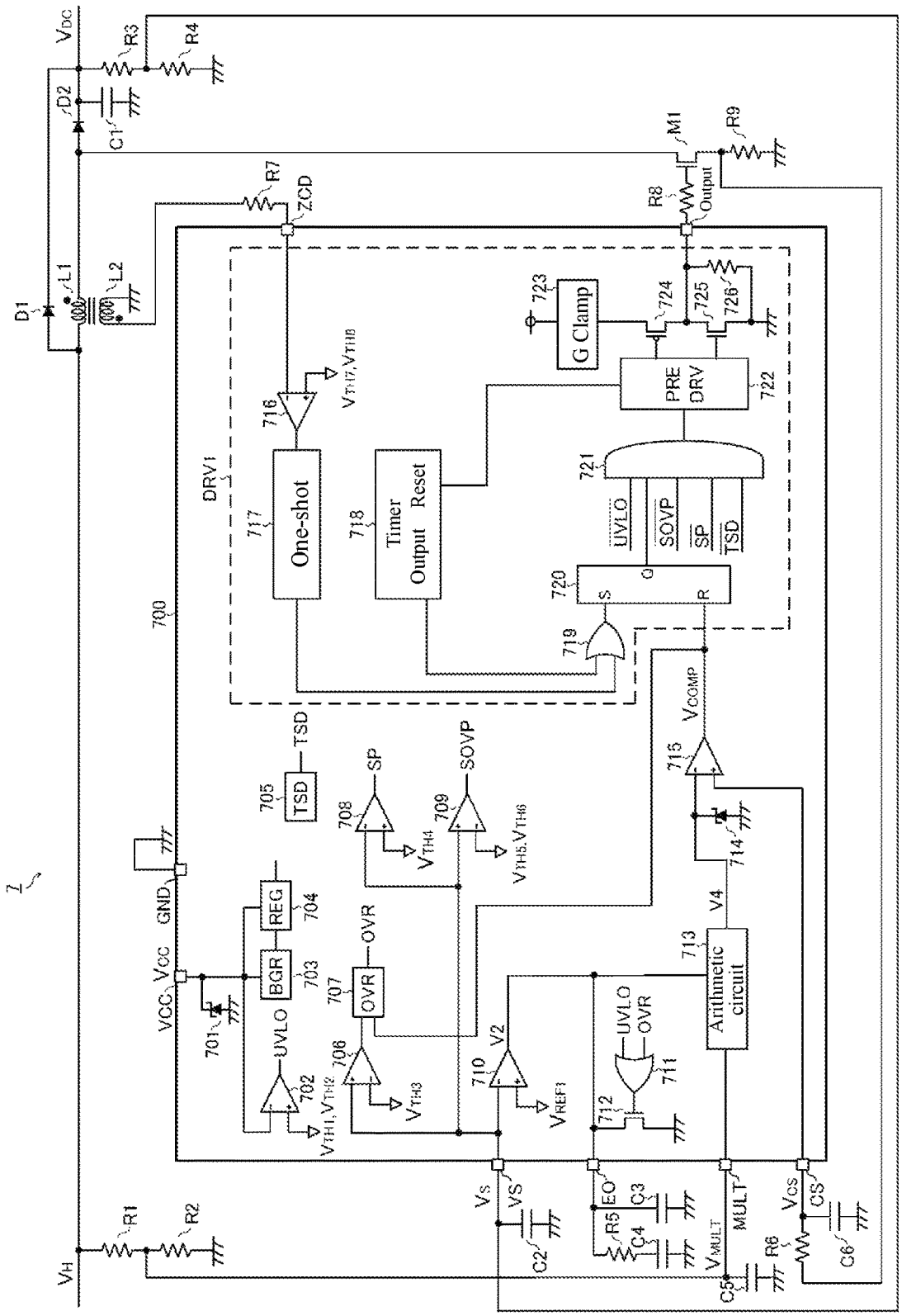
FIG. 2 is a diagram of an example of a power factor improvement circuit.

FIG. 2 shows a diagram of a configuration of the PFC circuit 7 according to an embodiment. The PFC circuit 7 includes a step-up DC/DC converter (switching regulator) described above. In addition, different from the embodiment, the PFC circuit 7 may further include a DC/DC converter in a type other than the step-up type.

The PFC circuit 7 includes an integrated circuit (IC) 700, resistors R1 to R9, capacitors C1 to C6, diodes D1 and D2, inductors L1 and L2, and a switching transistor M1. In this embodiment, the switching transistor M1 is a negative channel metal-oxide semiconductor (NMOS) transistor.

The IC 700 is a control circuit of the PFC circuit 7. The IC 700 includes a terminal $V_{CC}$, a terminal GND, a terminal ZCD, a terminal OUT, a terminal CS, a terminal MULT, a terminal EO and a terminal VS.

The first voltage $V_H$ is applied to one terminal of the resistor R1. The other terminal of the resistor R1 is connected to one terminal of the resistor R2, one terminal of the capacitor C5 and the terminal MULT. The other terminal of the resistor R2 and the other terminal of the capacitor C5 are connected to a ground potential. Using the configuration above, a divided voltage of the first voltage $V_H$ by the resistors R1 and R2, that is, a first voltage $V_{MULT}$, is supplied to the terminal MULT.

One terminal of the resistor R1 is connected to one terminal of the inductor L1 and the anode of the diode D1. The other terminal of the inductor L1 is connected to the anode of the diode D2 and the drain of the switching transistor M1. The cathode of each of the diodes D1 and D2 is connected to one terminal of the capacitor C1. The other terminal of the capacitor C1 is connected to the ground potential, the gate of the switching transistor M1 is connected to the terminal OUT through the resistor R8, and the source of the switching transistor M1 is connected to the ground potential through the resistor R9. Using the configuration above, the PFC circuit 7 includes a step-up DC/DC converter (switching regulator). An output voltage of the step-up DC/DC converter (switching regulator), that is, the voltage $V_{DC}$, is outputted from one terminal of the capacitor C1.

The inductor L1 is magnetically coupled with the inductor L2. One terminal of the inductor L2 is connected to the terminal ZCD through the resistor R7. The other terminal of the inductor L2 is connected to the ground potential. Using the configuration above, the IC 700 detects, by monitoring the voltage supplied to the terminal ZCD, zero-crossing of the current flowing in the inductor L1.

The voltage $V_{DC}$ is applied to one terminal of the resistor R3. The other terminal of the resistor R3 is connected to one terminal of the resistor R4, one terminal of the capacitor C2 and the terminal VS. The other terminal of the resistor R4 and the other terminal of the capacitor C2 are connected to the ground potential. Using the configuration above, a divided voltage of the voltage $V_{DC}$ by the resistors R3 and R4, that is, a first detection voltage $V_S$, is supplied to the terminal VS.

One terminal of the resistor R9 is connected to the source of the switching transistor M1, and the other terminal of the resistor R9 is connected to the ground potential. A voltage proportional to the current (the drain current of the switching transistor M1) flowing in the switching transistor M1 is generated between the two terminals of the resistor R9. For the voltage generated between the two terminals of the resistor R9, a high frequency component of the voltage generated between the two terminals of the resistor R9 is removed by an RC circuit (low-pass filter) consisting of the resistor R6 and the capacitor C6 to generate a second detection voltage $V_{CS}$, and the second detection voltage $V_{CS}$ is provided to the terminal CS. The second detection voltage $V_{CS}$ is a voltage corresponding to the current flowing in the switching transistor.

One terminal of the resistor R5 and one terminal of the capacitor C3 are connected to the terminal EO. The other terminal of the resistor R5 is connected to one terminal of the capacitor C4. The other terminal of the capacitor C3 and the other terminal of the capacitor C4 are connected to the ground potential. A power supply voltage $V_{CC}$ is supplied to the terminal $V_{CC}$, and the terminal GND is connected to the ground potential.

The PFC circuit 7 is an example of a load drive circuit that drives a load based on the output of a semiconductor integrated circuit device. The load of the PFC circuit 7 is the DC/DC converter 8, the microcomputer 9 and the signal processing circuit 10. In addition, the load drive circuit that drives a load based on the output of a semiconductor integrated circuit device is not limited to being a power factor improvement circuit, and may also be, for example, a power circuit that does not perform power factor correction.

Figure 9:
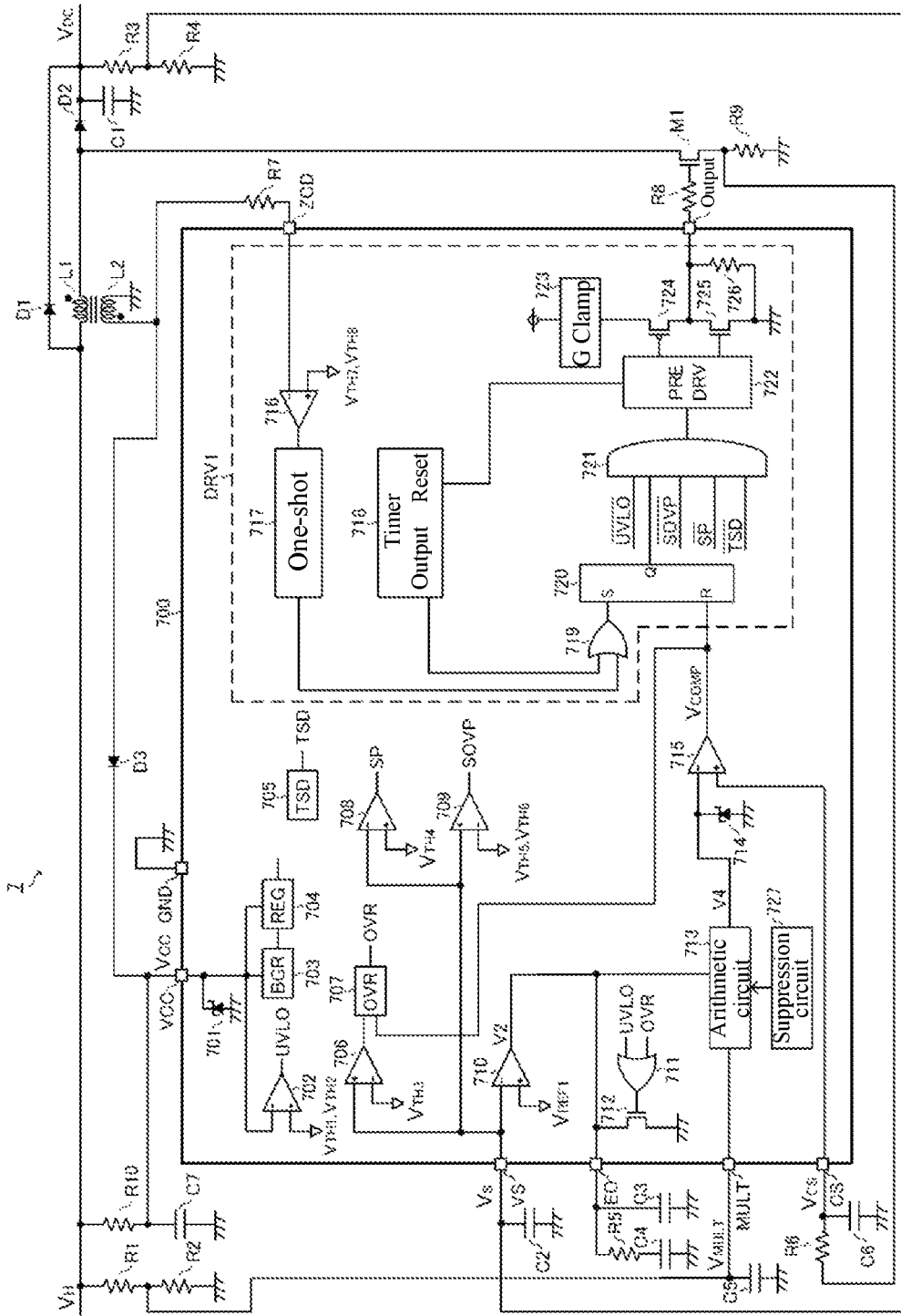
FIG. 9 is a diagram of an example of a power factor improvement circuit.

FIG. 9 shows a diagram of a configuration of the PFC circuit 7 according to an embodiment. The PFC circuit 7 includes a step-up DC/DC converter (switching regulator) described above. In addition, different from the embodiment, the PFC circuit 7 may further include a DC/DC converter in a type other than the step-up type.

The PFC circuit 7 includes an IC 700, resistors R1 to R9, capacitors C1 to C6, diodes D1 and D2, inductors L1 and L2, and a switching transistor M1. In this embodiment, the switching transistor M1 is an NMOS transistor.

The IC 700 is a control circuit of the PFC circuit 7. Moreover, the IC 700 is a packaged semiconductor integrated circuit device. The IC 700 includes a terminal $V_{CC}$, a terminal GND, a terminal ZCD, a terminal OUT, a terminal CS, a terminal MULT, a terminal EO and a terminal VS.

The first voltage $V_H$ is applied to one terminal of the resistor R1. The other terminal of the resistor R1 is connected to one terminal of the resistor R2, one terminal of the capacitor C5 and the terminal MULT. The other terminal of the resistor R2 and the other terminal of the capacitor C5 are connected to the ground potential. Using the configuration above, a divided voltage of the first voltage $V_H$ by the resistors R1 and R2, that is, a first voltage $V_{MULT}$, is supplied to the terminal MULT.

One terminal of the resistor R1 is connected to one terminal of the inductor L1 and the anode of the diode D1. The other terminal of the inductor L1 is connected to the anode of the diode D2 and the drain of the switching transistor M1. The cathode of each of the diodes D1 and D2 is connected to one terminal of the capacitor C1. The other terminal of the capacitor C1 is connected to the ground potential, the gate of the switching transistor M1 is connected to the terminal OUT through the resistor R8, and the source of the switching transistor M1 is connected to the ground potential through the resistor R9. Using the configuration above, the PFC circuit 7 includes a step-up DC/DC converter (switching regulator). An output voltage of the step-up DC/DC converter (switching regulator), that is, the voltage $V_{DC}$, is outputted from one terminal of the capacitor C1.

The inductor L1 is magnetically coupled with the inductor L2. One terminal of the inductor L2 is connected to the terminal ZCD through the resistor R7. The other terminal of the inductor L2 is connected to the ground potential. Using the configuration above, the IC 700 detects, by monitoring the voltage supplied to the terminal ZCD, zero trigger of the current flowing in the inductor L1.

The voltage $V_{DC}$ is applied to one terminal of the resistor R3. The other terminal of the resistor R3 is connected to one terminal of the resistor R4, one terminal of the capacitor C2 and the terminal VS. The other terminal of the resistor R4 and the other terminal of the capacitor C2 are connected to the ground potential. Using the configuration above, a divided voltage of the voltage $V_{DC}$ by the resistors R3 and R4, that is, a first detection voltage $V_S$, is supplied to the terminal VS.

One terminal of the resistor R9 is connected to the source of the switching transistor M1, and the other terminal of the resistor R9 is connected to the ground potential. A voltage proportional to the current (the drain current of the switching transistor M1) flowing in the switching transistor M1 is generated between the two terminals of the resistor R9. For the voltage generated between the two terminals of the resistor R9, a high frequency component of the voltage generated between the two terminals of the resistor R9 is removed by an RC circuit (low-pass filter) consisting of the resistor R6 and the capacitor C6 to generate a second detection voltage $V_{CS}$, and the second detection voltage $V_{CS}$ is provided to the terminal CS. The second detection voltage $V_{CS}$ is a voltage corresponding to the current flowing in the switching transistor.

One terminal of the resistor R5 and one terminal of the capacitor C3 are connected to the terminal EO. The other terminal of the resistor R5 is connected to one terminal of the capacitor C4. The other terminal of the capacitor C3 and the other terminal of the capacitor C4 are connected to the ground potential. A power supply voltage $V_{CC}$ is supplied to the terminal $V_{CC}$, and the terminal GND is connected to the ground potential.

The terminal $V_{CC}$ is connected to one terminal of the resistor R10, one terminal of the capacitor C7 and the cathode of the diode D3. The first voltage $V_H$ is supplied to the other terminal of the resistor R10. The anode of the diode D3 is connected to a connection node of the inductor L2 and the resistor R7. In addition, different from this embodiment, a configuration without the diode D3 may also be used.

Specific details of the configuration of the IC 700 are described below.

The IC 700 includes a Zener diode 701, a comparator 702, a bandgap reference voltage circuit 703, a constant voltage circuit 704 and an overheat protection circuit 705. The anode of the Zener diode 701 is connected to the ground potential, and the cathode of the Zener diode 701 is connected to the terminal $V_{CC}$.

The Zener diode 701 clamps the power supply voltage $V_{CC}$ at a Zener voltage. An inverting input terminal of the comparator 702, the bandgap reference voltage circuit 703 and the constant voltage circuit 704 are connected to the terminal $V_{CC}$.

The comparator 702 is a hysteresis comparator, compares the power supply voltage $V_{CC}$ with a threshold voltage, and outputs a low voltage lockout signal UVLO indicative of a comparison result. If the power supply voltage $V_{CC}$ is equal to or more than the threshold voltage, the low voltage lockout signal UVLO becomes a low level (indicating a level of a normal state), and if the power supply voltage $V_{CC}$ is less than the threshold voltage, the low voltage lockout signal UVLO becomes a high level (indicating a level of an abnormal state). The threshold voltage used by the comparator 702 converts a first threshold voltage $V_{TH1}$ (for example, 8 [V]) and a second threshold voltage $V_{TH2}$ (for example, 13 [V]) according to the level of the low voltage lockout signal UVLO.

The bandgap reference voltage circuit 703 generates a reference voltage by using the power supply voltage $V_{CC}$, and supplies it to the constant voltage circuit 704.

The constant voltage circuit 704 generates a constant voltage by using the power supply voltage $V_{CC}$ and the reference voltage, and supplies it to each part of the IC 700.

The overheat protection circuit 705 detects the ambient temperature, outputs an overheat protection signal TSD at a high level (a level indicating an abnormal state) when the ambient temperature is equal to or more than a threshold temperature, and outputs an overheat protection signal TSD at a low level (a level indicating a normal state) when the ambient temperature is less than the threshold temperature.

The IC 700 further includes a comparator 706, an over-boost reducing circuit 707, a comparator 708 and a comparator 709.

The comparator 706 compares the first detection voltage $V_S$ with a threshold voltage $V_{TH3}$ (for example, 2.25 [V]), and outputs a comparison result to the over-boost reducing circuit 707. An output signal of the converter 706 changes to a high level (a level indicating an abnormal state) when the first detection voltage $V_S$ is equal to or more than the threshold voltage $V_{TH3}$, and the output signal of the converter 706 changes to a low level (a level indicating a normal state) when the first detection voltage $V_S$ is less than the threshold voltage $V_{TH3}$.

The over-boost reducing circuit 707 outputs an over-boost reducing signal OVR. The over-boost reducing circuit 707 is based on the output signal of the comparator 706 and an output voltage $V_{COMP}$ of a comparator 30 to be described below. If the first detection voltage $V_S$ rises to the threshold voltage $V_{TH3}$, the over-boost reducing signal OVR is set to a high level (a level indicating an abnormal state), and other than this, the over-boost reducing signal OVR is set to a low level (a level indicating a normal state), until a second voltage V2 to be described below changes to a constant voltage $V_{BURST}$ to be described below.

The comparator 708 compares the first detection voltage $V_S$ with a threshold voltage $V_{TH4}$ (for example, 0.3 [V]), and outputs a comparison result, that is, a short-circuit protection signal SP. The short-circuit protection circuit SP changes to a low level (a level indicating a normal state) if the first detection voltage $V_S$ is equal to or more than the threshold voltage $V_{TH4}$, and the short-circuit protection signal SP changes to a high level (a level indicating an abnormal state) if the first detection voltage $V_S$ is less than the threshold voltage $V_{TH4}$.

The comparator 709 is a hysteresis comparator, compares the first detection signal $V_S$ with a threshold voltage, and outputs a static overvoltage protection signal SOVP indicative of a comparison result. The static overvoltage protection signal SOVP changes to a high level (a level indicating an abnormal state) if the first detection voltage $V_S$ is equal to or more than the threshold voltage, and the static overvoltage protection signal SOVP changes to a high level (a level indicating an abnormal state) if the first detection voltage $V_S$ is less than the threshold voltage. The threshold voltage used by the comparator 709 converts a fifth threshold voltage VTHS (for example, 2.6 [V]) and a sixth threshold voltage $V_{TH6}$ (for example, 2.7 [V]) according to the static overvoltage protection signal SOVP.

The IC 700 further includes an error amplifier circuit 710, an OR gate 711, an NMOS transistor 712, an arithmetic circuit 713, a Zener diode 714, a comparator 715 and a drive circuit DRV1.

The error amplifier circuit 710 amplifies an error between the first detection voltage $V_S$ and the reference voltage $V_{REF}$ according to the output voltage $V_{DC}$ of the step-up DC/DC converter (switching regulator) provided in the PFC circuit 7, and generates the second voltage V2. In addition, the amplification ratio of the error amplifier circuit 710 may be 1. The error amplifier circuit 710 supplies the second voltage V2 to the terminal EO and the arithmetic circuit 713.

The OR gate 711 outputs a logical sum of the low voltage lockout signal UVLO and the over-boost reducing signal OVR to the gate of the NMOS transistor 712. The drain of the NMOS transistor 712 is connected to the terminal EO, and the source of the NMOS transistor 712 is connected to the ground potential. The NMOS transistor 712 is a switch for discharging the second voltage applied to the terminal EO. Thus, when at least one of the low voltage lockout signal UVLO and the over-boost reducing signal OVR is at a low level, the NMOS transistor 712 is turned on and the second voltage V2 drops.

The arithmetic circuit 713 generates a third voltage by multiplying the AC voltage (the first voltage) $V_{MULT}$ by the second voltage V2, and generates a fourth voltage V4 by adding an offset voltage $V_{OFFSET}$ to the third voltage. In addition, the arithmetic circuit 713 may not add the offset voltage $V_{OFFSET}$ to the third voltage, but sets the third voltage and the fourth voltage as the same voltage.

The fourth voltage V4 is connected to an inverting input terminal of the comparator 715. The cathode of the Zener diode 714 is connected to the inverting input terminal of the comparator 715, and the anode of the Zener diode 715 is connected to the ground potential. The Zener diode 714 clamps the fourth voltage V4 at a Zener voltage.

The comparator 715 compares the second detection voltage $V_{CS}$ corresponding to the current flowing in the transistor M1 with the fourth voltage V4, and outputs the voltage $V_{COMP}$ indicative of a comparison result.

The drive circuit DRV1 turns on/off drive of the switching transistor M1, and turns off the switching transistor M1 according to the output of the comparator 715, that is, the voltage $V_{COMP}$, each time the second detection voltage $V_{CS}$ is more than the fourth voltage V4. That is to say, the drive circuit DRV1 turns off the switching transistor M1 according to the output of the comparator 715, that is, the voltage $V_{COMP}$. The configuration of the drive circuit DRV1 is not specifically defined, and any commonly known technique may be used.

FIG. 2 and FIG. 9 show individual examples of the drive circuit DRV1. The drive circuit DRV1 includes a comparator 716, a one-shot circuit 717, a timer 718, an OR gate 719, an RS trigger 720, an AND gate 721, a pre-driver 722, a gate clamping circuit 723, a positive channel metal-oxide semiconductor (PMOS) transistor 724, an NMOS transistor 725 and a resistor 726.

The comparator 716 is a hysteresis comparator, compares a voltage applied to the terminal ZCD with a threshold voltage, and outputs a comparison result to the one-shot circuit 717. The output signal of the comparator 716 changes to a low level if the voltage applied to the terminal ZCD is equal to or more than the threshold voltage, and the output signal of the comparator 716 changes to a high level if the voltage applied to the terminal ZCD is less than the threshold voltage. The threshold voltage used by the comparator 716 converts a seventh threshold voltage $V_{TH7}$ (for example, 0.67 [V]) and an eighth threshold voltage $V_{TH8}$ (for example, 0.9 [V]) according to the output signal of the comparator 716.

If the output signal of the comparator 716 changes to a high level, the on-shot circuit 717 supplies a one-shot pulse to a first input terminal of the OR gate 719.

If the timer 718 times for a certain period, the signal at a high level is supplied to a second input terminal of the OR gate 719. Each time the pre-driver 722 receives the signal at a high level from the AND gate, timing of the timer 718 is reset.

The OR gate 719 supplies a logical sum of the output signal of the one-shot circuit 717 and the timer 718 to a setting terminal(S) of the RS trigger 720. The output of the comparator 715, that is the voltage $V_{COMP}$, is supplied to a reset terminal (R) of the RS trigger 720. An output (Q) of the RS trigger 48 changes to a high level according to each positive edge of the voltage applied to the setting terminal (S), and changes to a low level according to each positive edge of the voltage applied to the reset terminal (R).

The AND gate 720 supplies a logical product of the low voltage lockout signal UVLO, the output signal of the RS trigger 720, an inverted signal of the static overvoltage protection signal SOVP, an inverted signal of the short-circuit protection signal SP, and an inverted signal of the overheat protection signal TSD to the pre-driver 722.

The pre-driver 722 complementarily turns on/off the PMOS transistor 724 and the NMOS transistor 725 according to an output of the AND gate 720.

The source of the PMOS transistor 724 is connected to the gate clamping circuit 723, and the drain of the PMOS transistor 724 is connected to the drain of the NMOS transistor 725, the terminal OUT and one terminal of the resistor 726. The source of the NMOS transistor 725 is connected to the ground potential and the other terminal of the resistor 726. The gate clamping circuit 723 generates a high-level voltage applied to the terminal OUT from the power supply voltage $V_{CC}$. The gate clamping circuit 723 clamps the high-level voltage applied to the terminal OUT to a certain voltage, and the high-level voltage applied to the terminal OUT does not exceed the gate-source withstand voltage of the switching transistor M1 when the power supply voltage $V_{CC}$ rises.

Associated details of the configuration of the PFC circuit 7 are as described above. Next, specific details of the configuration of an offset voltage generation circuit 713A provided in the arithmetic circuit 713 are given below.

Figure 3:
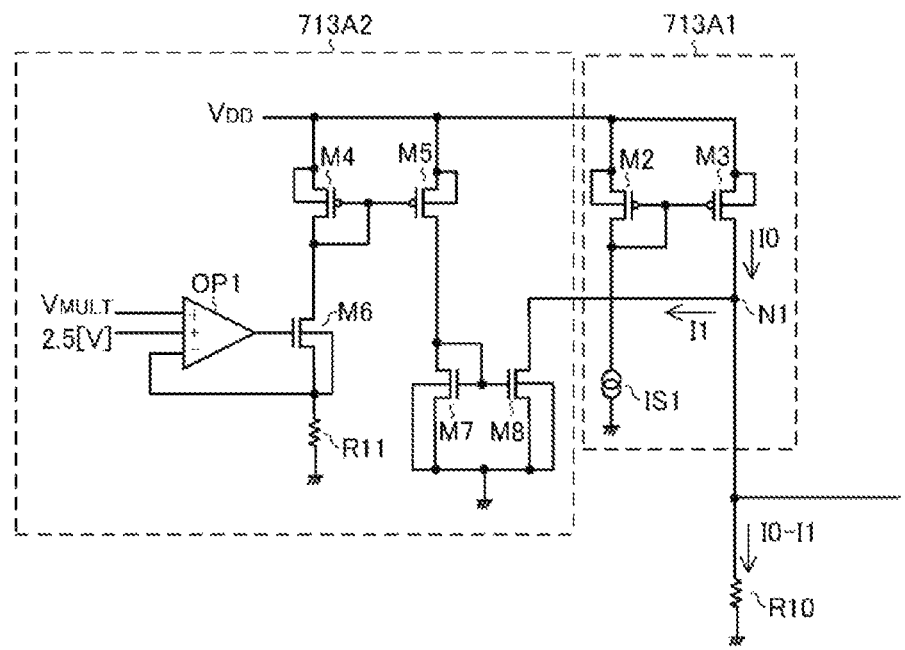
FIG. 3 is a diagram of an example of an offset voltage generation circuit.

FIG. 3 shows a diagram of an example of the offset voltage generation circuit 713A. The offset voltage generation circuit 713A includes a constant current generation circuit 713A1, a first current generation circuit 713A2, and a resistor R10.

The constant current generation circuit 713A1 includes a mirror circuit consisting of PMOS transistors M2 and M3 and a current source IS1. A constant voltage $V_{DD}$ outputted from the constant voltage circuit 704 is applied to the source and back gate of the PMOS transistor M2 and the source and back gate of the PMOS transistor M3. The gate and drain of the PMOS transistor M2 and the gate of the PMOS transistor M3 are connected to one terminal of the current source IS1. The other terminal of the current source IS1 is connected to the ground potential. The drain of the PMOS transistor M2 and one terminal of the resistor R10 are connected to a node N1. The other terminal of the resistor R10 is connected to the ground potential. The constant current generation circuit 713A generates a constant current I0, and supplies the constant current I0 to the node N1. The value of the constant current I0 is not specifically defined. For example, when the value of the constant current outputted by the current source IS1 is set to 1 [μA] and the current mirroring ratio is set to 6:1, the value of the constant current I0 is 167 [nA].

The first current generation circuit 713A2 includes an operational amplifier OP1, a sweep-out current mirror circuit consisting of PMOS transistors M4 and M5, an NMOS transistor M6, a resistor R11, and a drawing current mirror circuit consisting of NMOS transistors M7 and M8. A constant voltage $V_{DD}$ outputted from the constant voltage circuit 704 is applied to the source and back gate of the PMOS transistor M4 and the source and back gate of the PMOS transistor M5. The gate and drain of the PMOS transistor M4 and the gate of the PMOS transistor M5 are connected to the drain of the NMOS transistor M6. The source and back gate of the NMOS transistor M6 are connected to one terminal of the resistor R11 and an inverting input terminal of the operational amplifier OP1. The other terminal of the resistor R11 is connected to the ground potential. The first voltage $V_{MULT}$ is supplied to a first non-inverting terminal of the operational amplifier OP1, and a constant voltage of, for example, 2.5 [V], is supplied to a second non-inverting terminal of the operational amplifier OP1. An output terminal of the operational amplifier OP1 is connected to the gate of the NMOS transistor M6. The operational amplifier OP1 outputs a signal obtained by amplifying a difference between a voltage obtained by adding the first voltage $V_{MULT}$ and the constant voltage of, for example, 2.5 [V], and the voltage supplied to the inverting input terminal. The gate of the PMOS transistor M5 is connected to the drain and gate of the NMOS transistor M7, and the gate of the NMOS transistor M8. The source and back gate of the NMOS transistor M7 and the source and back gate of the NMOS transistor M8 are connected to the ground potential. The drain of the NMOS transistor M8 is connected to the node N1. The first current generation circuit 713A2 generates the first current I1, and the first current I1 is drawn from the node N1. The first current I1 is corresponding to the AC voltage (first voltage) $V_{MULT}$ and is variable. Specifically, the higher the AC voltage (first voltage) $V_{MULT}$ is, the larger the first current I1 is. In the example in FIG. 3, the higher the AC voltage (first voltage) $V_{MULT}$ is, the linearly larger the first current I1 is.

A current after the first current I1 is drawn out from the constant current I0, that is, a differential current (I0–I1), flows from the node N1 to the resistor R10. A product of the differential current (I0–I1) and the resistance value of the resistor R10 becomes the offset voltage $V_{OFFSET}$. Thus, the offset voltage $V_{OFFSET}$ is corresponding to the AC voltage (first voltage) $V_{MULT}$ and is variable. Specifically, the higher the AC voltage (first voltage) $V_{MULT}$ is, the smaller the offset voltage $V_{OFFSET}$ is.

In the example in FIG. 3, the higher the AC voltage (first voltage) $V_{MULT}$ is, the linearly smaller the offset voltage $V_{OFFSET}$ is.

Although the range of the offset voltage $V_{OFFSET}$ is not specifically defined, in the example in FIG. 3, for example, when the value of the constant current I0 is set to 167 [nA] as above, the current mirror ratio of the sweep-out current mirror circuit in the first current generation circuit 713A2 is set to 10:1, the resistance value of the current source connected to the sweep-out current mirror circuit, that is, the resistor R11, is set to 2 [mΩ], the ratio of the drawing current mirror in the first current generation circuit 713A2 is set to 1:1, and the resistance value of the resistor R10 is set to 161.2 [kΩ], the offset voltage $V_{OFFSET}$ is variable within a range of equal to or more than 6.9 [mV] and equal to or less than 26.8 [mV].

If a design value of the minimum value of the offset voltage $V_{OFFSET}$ is set to 6.9 [mV] as in the example above, the actual minimum value of the offset voltage V OFFSET according to the shift in a circuit constant may be set to equal or to more than zero.

If the minimum value of the offset voltage $V_{OFFSET}$ is less than zero, in the example in FIG. 3, the offset voltage generation circuit 713A does not operate normally, and so it is desired that the minimum of the offset voltage $V_{OFFSET}$ be equal to or more than zero. In addition, since a circuit configuration in which no unsatisfactory condition is generated when the minimum of the offset voltage $V_{OFFSET}$ is set to be less than zero is considered, it is also considered to have the minimum value of the offset voltage $V_{OFFSET}$ be less than zero.

Moreover, a trimming element for adjusting a circuit constant may be provided in the offset voltage generation circuit 713A to suppress the shift in the circuit constant, so that the design value of minimum value of the offset voltage $V_{OFFSET}$ can be zero or approach zero. The trimming element may be, for example, at least one fuse provided in a parallel circuit of a plurality of resistors in order to adjust resistance value of the current source, that is, the resistor, connected to the sweep-out mirror circuit in the first current generation circuit 713A2. The fuse can be trimmed and cut by, for example, laser.

Associated details of the configuration of the offset voltage generation circuit 713A are as described above. Next, specific details of the configurations of circuits other than the offset voltage generation circuit 713A of the arithmetic circuit 713 are given below. Apart from the offset voltage generation circuit 713A, the arithmetic circuit 713 further includes a first arithmetic circuit 713B, a first conversion circuit 713C, a second conversion circuit 713D and a second arithmetic circuit 713E.

Figure 4:
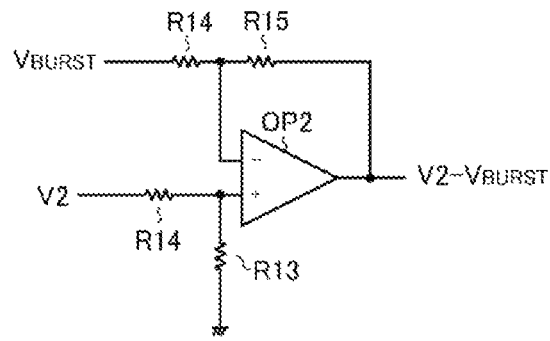
FIG. 4 is a diagram of an example of a first arithmetic circuit.

FIG. 4 shows a diagram of an example of the first arithmetic circuit 713B. The first arithmetic circuit 713B includes resistors R12 to R15 and an operational amplifier OP2. The second voltage V2 is applied to one terminal of the resistor R12. The other terminal of the resistor R12 and one terminal of the resistor R13 are connected to a non-inverting input terminal of the operation amplifier OP2. The other terminal of the resistor R13 is connected to the ground potential. A constant voltage $V_{BURST}$ is applied to one terminal of the resistor R14. The other terminal of the resistor R14 and one terminal of the resistor R15 are connected to the non-inverting input terminal of the operation amplifier OP2. The other terminal of the resistor R15 is connected to an output terminal of the operational amplifier OP2. The first arithmetic circuit 713B outputs a voltage obtained by subtracting the constant voltage $V_{BURST}$ from the second voltage V2 (V2–$V_{BURST}$).

Figure 5:
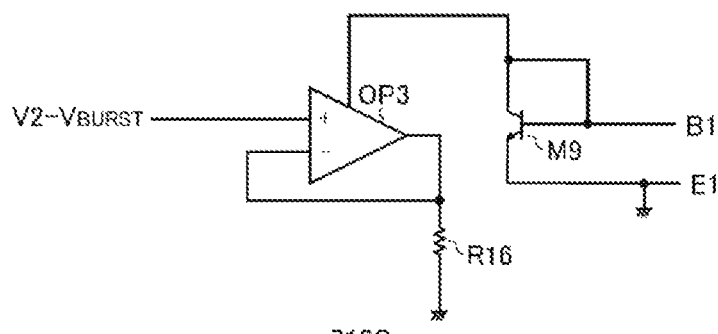
FIG. 5 is a diagram of an example of a first conversion circuit.

FIG. 5 shows a diagram of an example of the first conversion circuit 713C. The first conversion circuit 713C includes an operational amplifier OP3, a resistor R16 and an NPN bipolar transistor M9. The voltage (V2–$V_{BURST}$) is applied to a non-inverting input terminal of the operational amplifier OP3. An inverting input terminal and an output terminal of the operational amplifier OP3 are connected to one terminal of the resistor R16. The other terminal of the resistor R16 is connected to the ground potential. A power terminal of the operational amplifier OP3 is connected to the collector and base of the NPN bipolar transistor M9. The emitter of the NPN bipolar transistor M9 is connected to the ground potential. The first conversion circuit 713C converts the voltage (V2–$V_{BURST}$) to a current (I2–$I_{BURST}$), and outputs the current (I2–$I_{BURST}$) as the base current of the NPN bipolar transistor M9.

Figure 6:
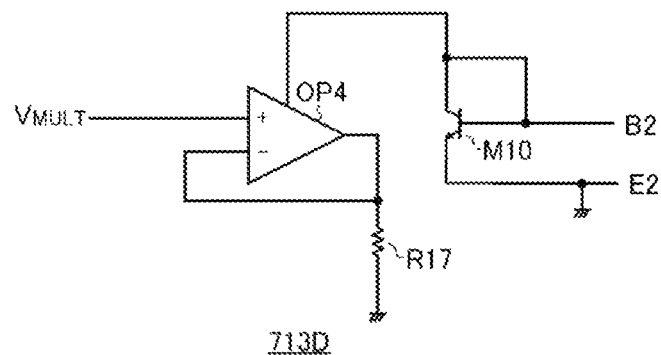
FIG. 6 is a diagram of an example of a second conversion circuit.

FIG. 6 shows a diagram of an example of the second conversion circuit 713D. The second conversion circuit 713D includes an operational amplifier OP4, a resistor R17 and an NPN bipolar transistor M10. The AC voltage (first voltage) $V_{MULT}$ is applied to a non-inverting input terminal of the operational amplifier OP4. An inverting input terminal and an output terminal of the operational amplifier OP4 are connected to one terminal of the resistor R17. The other terminal of the resistor R17 is connected to the ground potential. A power terminal of the operational amplifier OP4 is connected to the collector and base of the NPN bipolar transistor M10. The emitter of the NPN bipolar transistor M10 is connected to the ground potential. The second conversion circuit 713D converts the AC voltage (first voltage) $V_{MULT}$ to a current $I_{MULT}$, and outputs the current $I_{MULT}$ as the base current of the NPN bipolar transistor M10.

Figure 7:
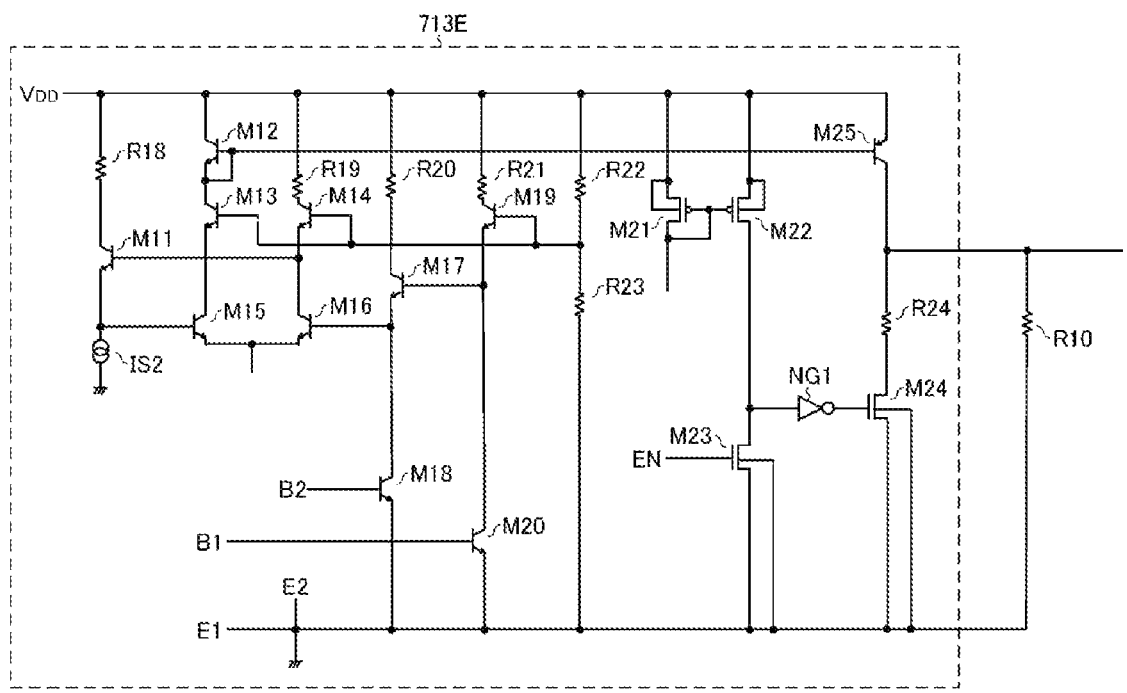
FIG. 7 is a diagram of an example of a second arithmetic circuit.

FIG. 7 shows a diagram of an example of the second arithmetic circuit 713E. The second arithmetic circuit 713E includes resistors R18 to R24, a current source IS2, NPN bipolar transistors M11 to M20, PMOS transistors M21 and M22, NMOS transistors M23 and M24, a PNP bipolar transistor M25, and a NOT gate NG1. The constant voltage $V_{DD}$ outputted from the constant voltage circuit 704 is applied to each terminal of the resistors R18 to R22, the collector of the NPN bipolar transistor M12, the source and back gate of the PMOS transistor M21, the source and back gate of the PMOS transistor M22, and the emitter of the PNP bipolar transistor M25. The other terminal of the resistor R18 is connected to the collector of the NPN bipolar transistor M11. The emitter of the NPN bipolar transistor M11 is connected to one terminal of the current source IS2 and the base of the NPN bipolar transistor M15. The other terminal of the current source IS1 is connected to the ground potential. The base and emitter of the NPN bipolar transistor M12 are connected to the base of the PNP bipolar transistor M25 and the collector of the NPN bipolar transistor M13. The emitter of the NPN bipolar transistor M13 is connected to the collector of the NPN bipolar transistor M15. The emitter of the NPN bipolar transistor M15 is connected to the emitter of the NPN bipolar transistor M16. The other terminal of the resistor R19 is connected to the collector of the NPN bipolar transistor M14. The emitter of the NPN bipolar transistor M14 is connected to the base of the NPN bipolar transistor M11 and the collector of the NPN bipolar transistor M16. The other terminal of the resistor R20 is connected to the collector of the NPN bipolar transistor M17. The emitter of the NPN bipolar transistor M17 is connected to the base of the NPN bipolar transistor M16 and the collector of the NPN bipolar transistor M18. The emitter of the NPN bipolar transistor M18 is connected to the ground potential. The base of the NPN bipolar transistor M18 is connected to the base and collector of the NPN bipolar transistor M10 in the second conversion circuit 713D. The NPN bipolar transistors M10 and M18 form a current mirror circuit. The other terminal of the resistor R21 is connected to the collector of the NPN bipolar transistor M19. The emitter of the NPN bipolar transistor M19 is connected to the base of the NPN bipolar transistor M17 and the collector of the NPN bipolar transistor M20. The emitter of the NPN bipolar transistor M20 is connected to the ground potential. The base of the NPN bipolar transistor M20 is connected to the base and collector of the NPN bipolar transistor M9 in the first conversion circuit 713C. The NPN bipolar transistors M9 and M20 form a current mirror circuit. The other terminal of the resistor R22 is connected to one terminal of the resistor R23, the gate of the NPN bipolar transistor M13, the gate of the NPN bipolar transistor M14, and the gate of the NPN bipolar transistor M19. The other terminal of the resistor R23 is connected to the ground potential. The gate and drain of the PMOS transistor M21 are connected to the gate of the PMOS transistor M22. The PMOS transistors M21 and M22 form a current mirror circuit. The drain of the PMOS transistor M22 is connected to the drain of the NMOS transistor M23 and an input terminal of the NOT gate. An enable signal EN is supplied to the gate of the NMOS transistor M23. The source and back gate of the NMOS transistor M23 are connected to the ground potential. An output terminal of the NOT gate is connected to the gate of the NMOS transistor M24. The source and back gate of the NMOS transistor M24 are connected to the ground potential. The drain of the NMOS transistor M24 is connected to one terminal of the resistor R24. The other terminal of the resistor R24 is connected to the collector of the PNP bipolar transistor M25 and one terminal of the resistor R10. The other terminal of the resistor R10 is connected to the ground potential. The second arithmetic circuit 713E multiples the current ($I2-I_{BURST}$) by the current $I_{MULT}$, and outputs the multiplication result, that is, an output current $I_{OUT}$ to the resistor R10. The resistor R10 converts the output current $I_{OUT}$ to a voltage ($K \times V_{MULT}(V2-V_{BURST})$). In addition, the constant K is determined by a ratio between the resistance value of the resistor R16 in the first conversion circuit 713C to the resistance value of the resistor R10, and a ratio between the resistance value of the resistor R17 in the second conversion circuit 713D and the resistance value of the resistor R10. A current I3 outputted by the current source IS2 in the second arithmetic circuit 713E is a voltage proportional to a peak value (maximum value) of the voltage $V_{MULT}$. In addition, the second arithmetic circuit 713E can be switched between an enabled state and a disabled state by the enable signal EN.

The resistor R10 in FIG. 7 is the same as the resistor R10 in the offset voltage generation circuit 713A in FIG. 3. Thus, the offset voltage $V_{OFFSET}$ is also applied to the resistor R10. Thus, a fourth voltage V4 generated in the resistor R10 by two terminal voltages of the resistor R10 is expressed by the equation below.

$$V4 = K \times V_{MULT}(V2-V_{BURST}) + V_{OFFSET}$$

Herein, to illustrate the effect of the PFC circuit 7, a circuit formed by removing the offset voltage generation circuit 713A from the PFC circuit 7 is compared with the PFC circuit 7.

Figure 8:
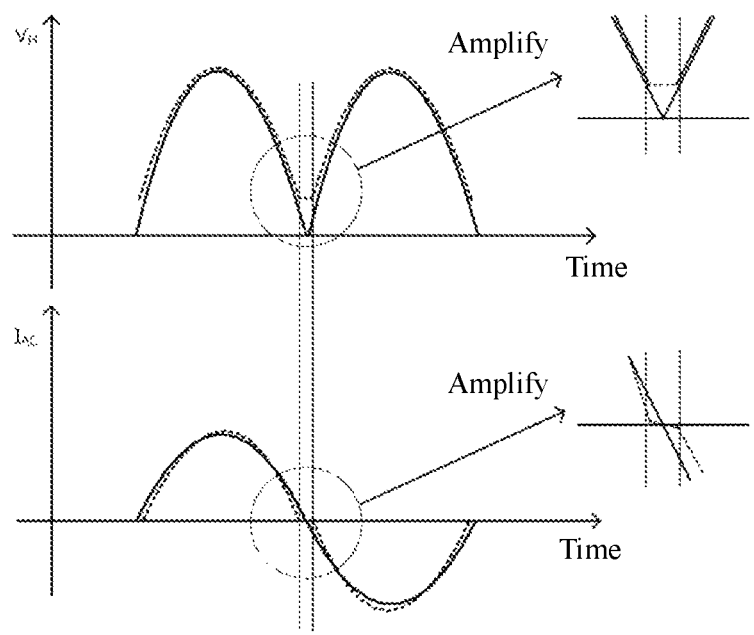
FIG. 8 is a waveform diagram of an AC voltage and an input current.

In the circuit formed by removing the offset voltage generation circuit 713A from the PFC circuit 7, the on time of the switching transistor M1 when the first voltage $V_H$ is near 0 [V] is reduced by the action of the drive circuit DRV1. Hence, when the first voltage $V_H$ is around 0 V, the capacitor 6 provided on the output side of the rectifier circuit 5 cannot be fully discharged, and as a result, the current outputted from the rectifier circuit 5 is temporarily stopped, and distortion of the input current IAC is caused (referring to the dotted line in FIG. 8).

On the other hand, in the PFC circuit 7, when the first voltage $V_H$ is around 0 V, the offset voltage $V_{OFFSET}$ increases and the fourth voltage V4 also increases, and so the on time of the switching transistor M1 is increased by the action of the drive circuit DRV1. Hence, when the first voltage $V_H$ is around 0 [V], the capacitor 6 provided on the output side of the rectifier circuit 5 can be fully discharged, and as a result, the current is smoothly outputted from the rectifier circuit 5 and distortion of the input current IAC is suppressed (referring to the solid line in FIG. 8). That is to say, the IC 700 is capable of suppressing the THD of the PFC circuit 7.

In addition, since the offset voltage $V_{OFFSET}$ does not need to be increased other than when the first voltage $V_H$ is around 0 [V], the offset voltage $V_{OFFSET}$ is variable as desired in the embodiment. However, it is additionally allowed that the offset voltage $V_{OFFSET}$ be fixed for unused offset voltage $V_{OFFSET}$ other than when the first voltage $V_H$ is around 0 V.

The comparator 702, the overheat protection circuit 705, the comparator 708 and the comparator 709 are respectively anomaly detection circuits detecting anomalies of the IC 700. The AND gate 721 stops output of the IC 700 when the anomaly is detected by the anomaly detection circuit. In addition, in this embodiment, "the IC 700 stops output" refers to a state in which the voltage applied to the terminal OUT is kept at a low level, and a state in the switching operation of the switching transistor M1 is stopped.

The IC 700 further includes a suppression circuit 727. The suppression circuit 727 suppresses current consumption of the IC 700 when the anomaly is detected by the anomaly detection circuit.

Figure 10:
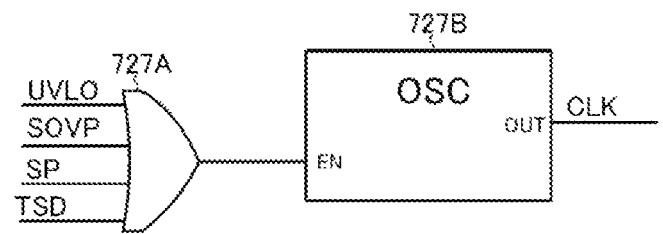
FIG. 10 is a diagram of an example of a suppression circuit.

FIG. 10 shows a diagram of an example of the suppression circuit 727. The suppression circuit 727 in FIG. 10 includes an OR gate 727A and an oscillator 727B.

The OR gate 727A supplies a logical sum of the low voltage lockout signal UVLO, the static overvoltage protection signal SOVP, the short-circuit protection signal SP and the overheat protection signal TSD to the oscillator 727B.

The oscillator 727B changes to a disabled state when an output signal of the OR gate 727A is at a high level and does not output a clock signal CLK. On the other hand, the oscillator 727B changes to an enabled state when the output signal of the OR gate 727A is at a low level and outputs the clock signal CLK. The arithmetic circuit 713 stops operating when the clock signal CLK is not supplied. Thus, when the anomaly detection circuit is used to detect any anomaly, current consumption of the oscillator 727B and the arithmetic circuit 713 can be suppressed to further suppress the current consumption of the IC 700. In addition, the clock signal CLK outputted from the oscillator 727B may also be supplied to logic circuits other than the arithmetic circuit 713.

The IC 700 further includes an overvoltage detection circuit 728 and a current drawing circuit 729 (not shown in FIG. 9).

Figure 11:
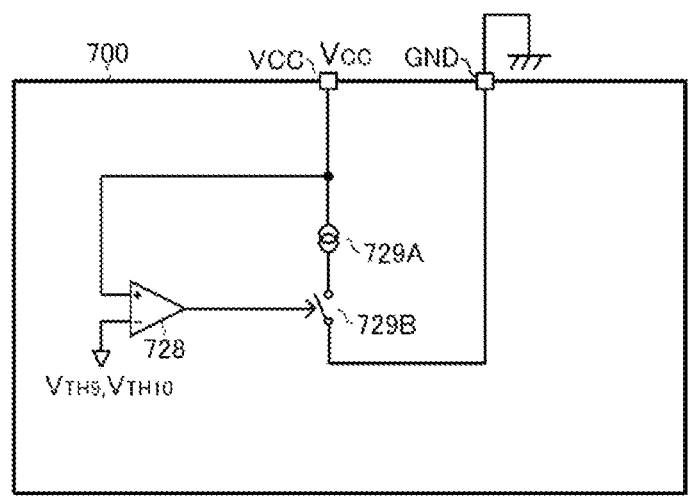
FIG. 11 is a diagram of an example of an overvoltage detection circuit and a current drawing circuit.

FIG. 11 shows a diagram of an example of the overvoltage detection circuit 728 and the current drawing circuit 729.

The overvoltage detection circuit 728 is a hysteresis comparator, compares the power supply voltage $V_{CC}$ with a threshold voltage, and outputs a comparison result to a switch 729B to be described below. If the power supply voltage $V_{CC}$ is equal to or more than the threshold voltage, the output signal of the overvoltage detection circuit 728 becomes a high level (indicating a level of an overvoltage), and if the power supply voltage $V_{CC}$ is less than the threshold voltage, the output signal becomes a low level (indicating a level of a non-overvoltage). The threshold voltage used by the overvoltage detection circuit 728 converts a ninth threshold voltage $V_{TH9}$ (for example, 34 [V]) and a tenth threshold voltage $V_{TH10}$ (for example, 38 [V]) according to the output signal of the overvoltage detection circuit 728.

The current drawing circuit 729 includes a constant current source 729A and the switch 729B. One terminal of the switch 729B is connected to the terminal $V_{CC}$ through the constant current source 729A. The other terminal of the switch 729B is connected to the ground GND. The switch 792B is turned on when the output signal of the overvoltage detection circuit 728 is at a high level, and is turned off when the output signal of the overvoltage detection circuit 728 is at a low level. Thus, the constant current source 729A draws the constant current from the terminal $V_{CC}$ only when the power supply voltage $V_{CC}$ is an overvoltage. In addition, different from this embodiment, when the power supply voltage $V_{CC}$ is an overvoltage, the larger the power supply voltage $V_{CC}$ is, the larger the current drawn from the terminal $V_{CC}$ is. In this variation example, for example, an error amplifier that outputs the error between the power supply voltage $V_{CC}$ and the reference voltage, and a current source that outputs a current corresponding to the output of the error amplifier can be used to implement the above.

Figure 12:
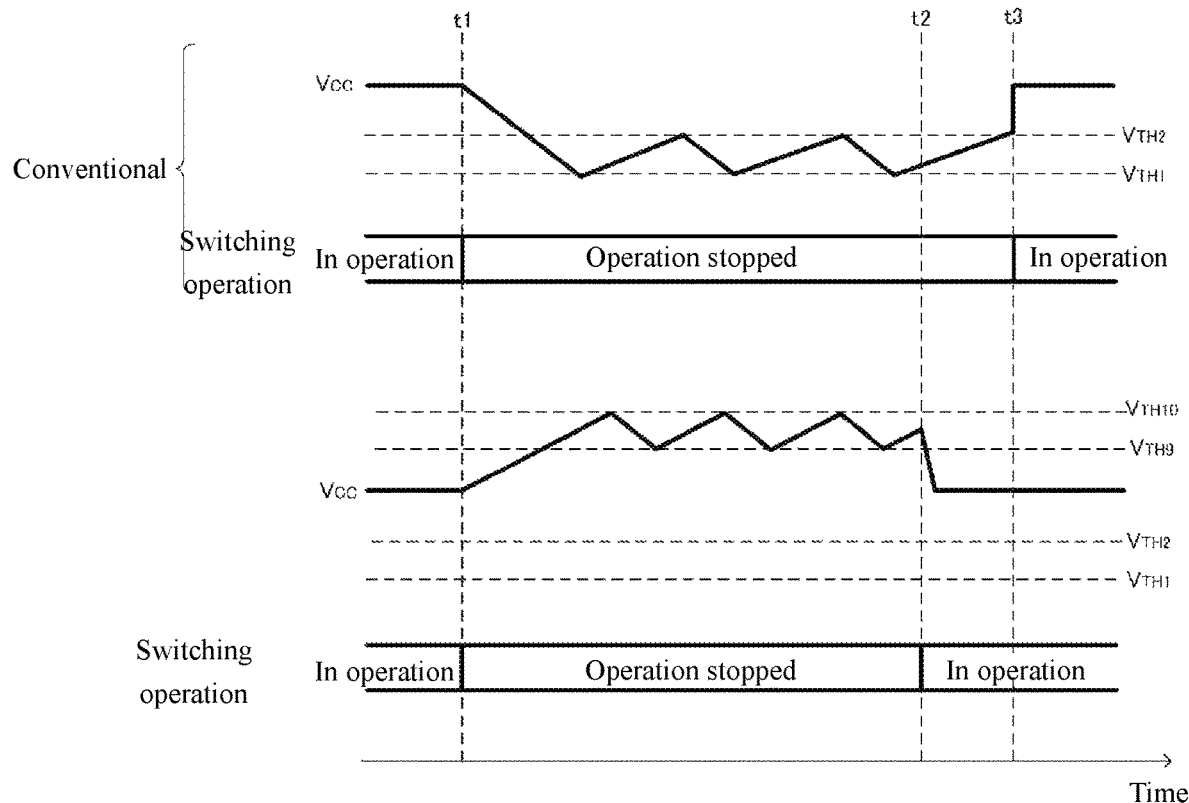
FIG. 12 is a timing diagram of a waveform of the power supply voltage of an IC.
Figure 13:
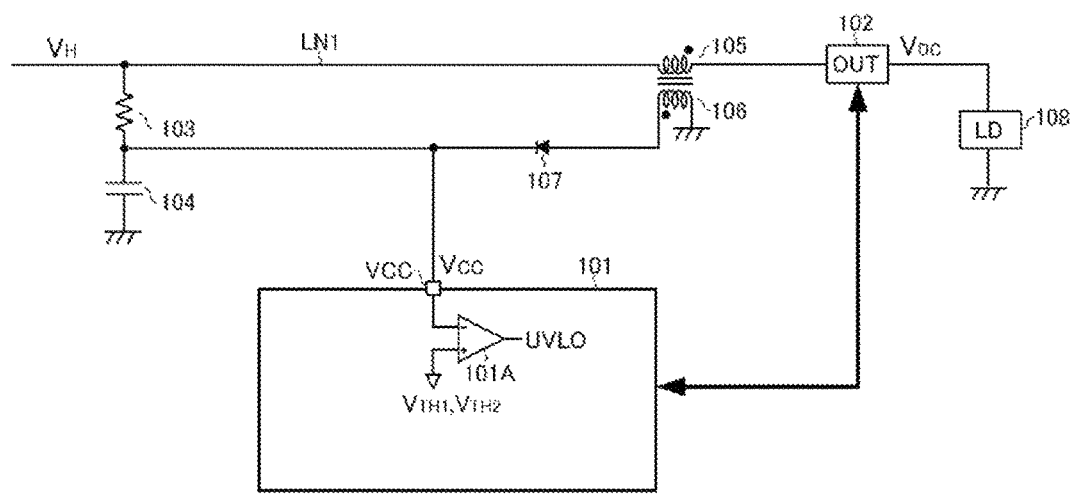
FIG. 13 is a brief configuration diagram of a power factor improvement circuit of a conventional semiconductor integrated circuit device of the prior art.
Figure 14:
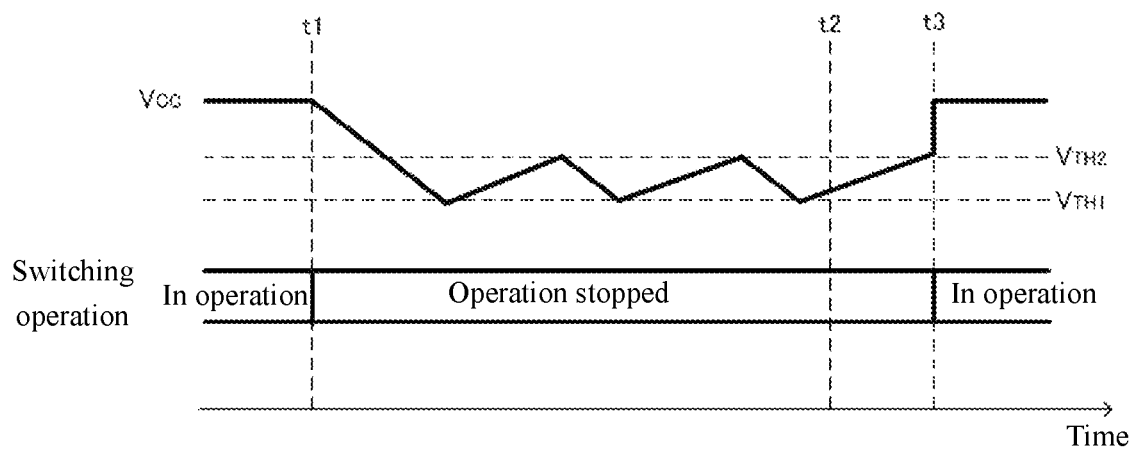
FIG. 14 is a timing diagram of a waveform of the power supply voltage of a conventional semiconductor integrated circuit device.

FIG. 12 shows a timing diagram of a waveform of the power supply voltage $V_{CC}$ of the IC 700. In addition, in FIG. 12, for comparison, a waveform of the power supply voltage $V_{CC}$ of the conventional semiconductor integrated circuit device 101 is depicted.

In the IC 700, since the current consumption of the IC 700 can be suppressed by the suppression circuit 727 when the switching operation of the switching transistor M1 is stopped, the power supply voltage $V_{CC}$ can be increased. Accordingly, the IC 700 is different from the conventional semiconductor integrated circuit device 101, and can respond to the change in a load at the second timing t2. That is to say, comparing with the conventional semiconductor integrated circuit device 101, the IC 700 can improve load responsiveness.

Moreover, in the PFC circuit 7, the power supply voltage $V_{CC}$ becomes greater when the switching operation of the switching transistor M1 is stopped than when the switching operation of the switching transistor M1 is not stopped. Accordingly, load responsiveness can be further improved. For example, by having the value of the constant current outputted by the current source in the IC 700 be smaller than the value of the constant current outputted by the conventional semiconductor integrated circuit device 101, the power supply voltage $V_{CC}$ becomes greater when the switching operation of the switching transistor M1 is stopped than when the switching operation of the switching transistor M1 is not stopped.

Since the IC 700 includes the overvoltage detection circuit 728 and the current drawing circuit 729, the power supply voltage $V_{CC}$ can be reduced when the power supply voltage $V_{CC}$ becomes an overvoltage.

Moreover, when the IC 700 is used, the decrease in the power supply voltage $V_{CC}$ can be suppressed and so the capacitance of the capacitor C7 can be decreased. Thus, the capacitor C7 can be configured to be a low-cost ceramic capacitor instead of a non-electrolytic capacitor.

Moreover, if the capacitance of the capacitor C7 is decreased, a charging time of the capacitor C7 becomes shorter when the electronic device 1 is connected to a power supply, so that the start-up time of the electronic device 1 can be shortened.

The invention claimed is:

1. A semiconductor integrated circuit device having a terminal configured to be applied with a power supply voltage, comprising:
   an anomaly detection circuit configured to detect anomaly;
   an output stop circuit configured to stop an output of the semiconductor integrated circuit device when anomaly is detected by the anomaly detection circuit;
   a suppression circuit configured to suppress current consumption of the semiconductor integrated circuit device when anomaly is detected by the anomaly detection circuit;
   an overvoltage detection circuit configured to detect the power supply voltage is an overvoltage; and a current drawing circuit configured to draw a current from the terminal when the overvoltage of the power supply voltage is detected by the overvoltage detection circuit.

2. The semiconductor integrated circuit device of claim 1, wherein the suppression circuit includes:
   an oscillation circuit, configured to oscillate a clock signal; and
   a logic circuit, operating based on the clock signal, wherein when anomaly is detected by the anomaly detection circuit, the oscillation circuit is disabled.

3. A load drive circuit, comprising the semiconductor integrated circuit device of claim 1, wherein a load is driven based on the output of the semiconductor integrated circuit device.

4. The load drive circuit of claim 3, which is a power factor improving circuit.

5. An electronic device, comprising:
   a load; and
   the load drive circuit of claim 3 for driving the load.

6. The electronic device of claim 5, which is a lighting device capable of performing at least one of dimming or toning.

7. A load drive circuit, comprising a semiconductor integrated circuit device having a terminal configured to be applied with a power supply voltage, wherein the semiconductor integrated circuit device comprises:

an anomaly detection circuit configured to detect anomaly;

an output stop circuit configured to stop an output of the semiconductor integrated circuit device when anomaly is detected by the anomaly detection circuit; and a suppression circuit, configured to suppress current consumption of the semiconductor integrated circuit device when anomaly is detected by the anomaly detection circuit, wherein a load is driven based on the output of the semiconductor integrated circuit device, and wherein the power supply voltage becomes greater when the output of the semiconductor integrated circuit device is stopped than when the output of the semiconductor integrated circuit device is not stopped.

* * * * *